(12) United States Patent
Friedrich

(10) Patent No.: US 7,590,087 B2
(45) Date of Patent: Sep. 15, 2009

(54) METHODS FOR WIRELESS DATA TRANSMISSION BETWEEN A BASE STATION AND ONE OR MORE TRANSPONDERS

(75) Inventor: Ulrich Friedrich, Ellhofen (DE)

(73) Assignee: ATMEL Germany GmbH, Heilbronn (DE)

( * ) Notice: Subject to any disclaimer, the term of this patent is extended or adjusted under 35 U.S.C. 154(b) by 487 days.

(21) Appl. No.: 11/080,526

(22) Filed: Mar. 16, 2005

(65) Prior Publication Data

US 2005/0207391 A1   Sep. 22, 2005

(30) Foreign Application Priority Data

Mar. 16, 2004   (DE) .................. 10 2004 013 885

(51) Int. Cl.
*H04B 3/46* (2006.01)
*H04L 7/02* (2006.01)
*H04Q 5/22* (2006.01)
*H03K 7/08* (2006.01)
*H02M 3/24* (2006.01)
*H04J 3/06* (2006.01)

(52) U.S. Cl. .................. 370/328; 370/349; 375/361; 375/238; 375/259; 340/10.4; 363/97

(58) Field of Classification Search .................. 370/313, 370/328, 338, 349; 455/41.2; 375/362, 238, 375/361, 259; 340/10.4; 343/97
See application file for complete search history.

(56) References Cited

U.S. PATENT DOCUMENTS

| 4,860,323 | A  * | 8/1989  | Malter ..................... 375/362 |
| 6,775,323 | B1 * | 8/2004  | Vasudevan Pillai et al. . 375/238 |
| 6,885,568 | B2 * | 4/2005  | Kernahan et al. ............ 363/97 |
| 6,906,615 | B2 * | 6/2005  | Friedman ................... 340/10.4 |
| 7,075,413 | B2 * | 7/2006  | Friedman ................... 340/10.4 |
| 7,173,519 | B2 * | 2/2007  | Friedrich et al. ........... 340/10.4 |
| 7,359,472 | B2 * | 4/2008  | Friedrich ..................... 375/361 |
| 2003/0133435 | A1 | 7/2003 | Friedrich |
| 2004/0036576 | A1 * | 2/2004 | Friedman ................... 340/10.4 |
| 2004/0257293 | A1 * | 12/2004 | Friedrich et al. ............ 343/860 |
| 2005/0018639 | A1 * | 1/2005 | Friedrich et al. ............ 370/338 |
| 2005/0053024 | A1 * | 3/2005 | Friedrich .................... 370/313 |
| 2005/0200458 | A1 * | 9/2005 | Friedman ................... 340/10.4 |
| 2005/0207391 | A1 * | 9/2005 | Friedrich .................... 370/349 |
| 2005/0231329 | A1 * | 10/2005 | Friedrich ................... 340/10.3 |
| 2005/0232221 | A1 * | 10/2005 | Friedrich .................... 370/349 |
| 2005/0232369 | A1 * | 10/2005 | Friedrich .................... 375/259 |

(Continued)

FOREIGN PATENT DOCUMENTS

DE   101 38 217 A1   3/2003

(Continued)

*Primary Examiner*—William D Cumming
(74) *Attorney, Agent, or Firm*—Muncy, Geissler, Olds & Lowe, PLLC

(57) ABSTRACT

A method and device for wireless data transmission between a base station and one or more transponders, in which electromagnetic carrier waves are emitted by the base station and symbols are transmitted from a given transponder to the base station by modulation and backscattering of the electromagnetic carrier waves, wherein a change in a modulation state takes place synchronously with synchronization markers transmitted by the base station. A change in the modulation state is carried out by a transponder with a specifiable time delay that is relative to the synchronization markers.

9 Claims, 3 Drawing Sheets

U.S. PATENT DOCUMENTS

| | | | |
|---|---|---|---|
| 2005/0233696 A1* | 10/2005 | Friedrich | 455/41.2 |
| 2005/0242927 A1* | 11/2005 | Friedrich | 340/10.2 |
| 2006/0198327 A1* | 9/2006 | Friedrich | 370/278 |
| 2006/0273883 A1* | 12/2006 | Pillai et al. | 340/10.42 |
| 2007/0030125 A1* | 2/2007 | Friedrich | 340/10.1 |
| 2007/0030126 A1* | 2/2007 | Friedrich | 340/10.2 |
| 2007/0030921 A1* | 2/2007 | Friedrich | 375/300 |
| 2007/0063819 A1* | 3/2007 | Friedrich | 340/10.1 |

FOREIGN PATENT DOCUMENTS

| | | |
|---|---|---|
| DE | 102 04 347 A1 | 8/2003 |
| EP | 1464987 A2 | 10/2004 |
| WO | WO 96/23308 | 8/1996 |

\* cited by examiner

NEW SHEET

METHODS FOR WIRELESS DATA TRANSMISSION BETWEEN A BASE STATION AND ONE OR MORE TRANSPONDERS

This nonprovisional application claims priority under 35 U.S.C. § 119(a) on German Patent Application No. 102004013885, which was filed in Germany on Mar. 16, 2004, and which is herein incorporated by reference.

BACKGROUND OF THE INVENTION

1. Field of the Invention

The present invention relates to a method for wireless data transmission between a base station and one or more transponders and also a modulation control device for carrying out the method.

2. Description of the Background Art

Such transmission methods between one or more base stations or readers and one or more transponders are used, for example, in contactless identification systems or so-called radio frequency identification (RFID) systems. Sensors, for example, for temperature measurement, may also be integrated in the transponders. Such transponders are also referred to as remote sensors.

The transponders and their transmitting and receiving devices customarily do not have an active transmitter for data transmission to the base station. Such non-active systems are called passive systems if they do not have their own energy supply, and semi-passive systems if they have their own energy supply. Passive transponders take the energy they require for their supply from the electromagnetic field emitted by the base station.

In general, so-called backscatter coupling is used to transmit data from a transponder to the base station using UHF or microwaves in the far field of the base station. To this end, the base station emits electromagnetic carrier waves, which the transmitting and receiving device in the transponder modulates and reflects appropriately for data to be transmitted to the base station using a modulation method. The typical modulation methods for this purpose are amplitude modulation, phase modulation and amplitude shift keying (ASK) subcarrier modulation of the backscatter signal, in which the frequency and/or the phase position of the subcarrier is changed.

The data transmission from a transponder to the base station can occur synchronously with synchronization markers or so-called "notches" that are transmitted by the base station.

A variety of methods are known for producing the synchronization markers. In general, the carrier signal is amplitude-modulated and/or phase-modulated with a modulating signal by the base station in such a manner that a detection unit within the transponder, which is basically designed for amplitude modulation of the carrier signal, can detect the synchronization marker. A synchronization marker is typically detected in a transponder using what is known as an RSSI circuit.

Methods for increasing the transmission range are known which do not completely blank the carrier signal during the modulation period, i.e., which have a modulation index that is less than one.

To reduce the bandwidth required, the modulation signal can have a sine or cosine shape during the modulation period, i.e. the carrier signal is not blanked with a square-wave function, but instead is switched off and then back on again with a sinusoidal profile. An example of this is the method known as double sideband modulation (DSBM) with a suppressed carrier. When a cosine function is used as the modulation signal, the DSBM can be described mathematically by the following basic equation:

$$u_m(t) = C * \cos(\omega_0 * t) * \cos(\Omega * t)$$
$$= \frac{C}{2} * \cos((\Omega + \omega_0) * t) + \frac{C}{2} * \cos((\Omega - \omega_0) * t),$$

where $u_m(t)$ represents the modulated signal, C represents a constant, $\omega_0$ represents the angular frequency of the modulation signal, $\Omega$ represents the angular frequency of the carrier signal, and t represents the time.

The carrier frequency here is suppressed in the spectrum of the modulated signal $u_m(t)$. This type of generation of synchronization markers improves utilization of the available bandwidth as compared to modulation methods with no carrier suppression. Moreover, the supply of energy to the transponder can be improved.

The data to be transmitted consist of a sequence of symbols, each of which customarily are coded and transmitted by a transponder within a predefined time interval or symbol interval. The time interval or symbol interval is customarily determined by two successive synchronization markers. In a binary transmission, the value of a symbol is either "0" or "1."

Various methods for coding a symbol are known. A first coding method is known as non-return to zero (NRZ) coding. The modulation state of a serially transmitted signal, known as a line code, corresponds here to the value of the symbol to be transmitted. A variation of this method is known as non-return to zero inverted (NRZI) coding. In this method, a "1" is represented by a change in the modulation state of the serially transmitted signal at the beginning of a symbol interval or bit interval. When a "0" is transmitted, no change in the serial signal takes place. The aforementioned methods are described, for example, in the textbook by Klaus Finkenzeller, RFID-Handbuch, $3^{rd}$ edition, HANSER, 2002, see especially Chapter 6.1, Codierung im Basisband (coding in the baseband).

If the coding or a change in the modulation state in the transponder takes place approximately simultaneously with the synchronization markers transmitted by the base station, there exists the danger that the generation or transmission of the synchronization markers will make it more difficult to evaluate the simultaneously backscattered signals, which have a very low power.

If, for example, a synchronization marker is generated with the aid of double sideband modulation, it is customarily done with the aid of an IQ modulator whose output signal is amplified by a power amplifier. The modulation signal is applied to the I connection of the IQ modulator.

In this regard, it is frequently necessary in conventional systems to monitor and, if necessary, adjust the zero-point symmetry of the resulting envelope curve in order to transmit a constant power, among other reasons. When such an asymmetry arises, this leads to a change in the magnitude of the signal backscattered by a transponder. Additional nonlinearities can also have an effect on the backscattered signal. Such effects on the backscattered signal, traceable to the generation of the synchronization markers, significantly complicate evaluation of the signal. Consequently, it is frequently useful overall to monitor and, if necessary, adjust the modulated carrier signal. Alternatively, adaptive systems are also used, which evaluate the present backscattered signals on the basis of past transmissions or data. The methods mentioned have in common that they, however, require significant implementation complexity in the base station.

SUMMARY OF THE INVENTION

It is therefore an object of the present invention to provide a method for wireless data transmission of the initially mentioned type which improves the reliability of transmission between transponder and base station, with comparatively low circuit complexity, as well as an associated modulation control device.

In accordance with the invention, a change in the modulation state is carried out by a given transponder with a specifiable time delay relative to the synchronization markers. As a result of the time delay between the synchronization markers generated by the base station and a possible change in the modulation state of the backscattered signal, misreading of the signal backscattered from the transponder resulting from the generation of the synchronization markers is largely avoided. In other words, the transponder waits to change the modulation state until interference resulting from the generation of the synchronization markers is no longer to be expected. A method of this nature is simple to implement, both in the base station and in the transponder, and improves transmission reliability and transmission range.

In a further development of the method according to claim 2, the time delay is specified such that it lies in a range from one eighth to one quarter of the duration within which a symbol is coded. This permits sensible utilization of this time interval or symbol interval, which customarily is defined by two successive synchronization markers.

The time delay can be specified by the base station in that it transmits a reference marker in a header section of a data packet. In the older German patent application 102 04 347 and DE 101 38 217 A1 (which corresponds to U.S. Publication No. 2003/0133435), and which are hereby incorporated in the present application by reference, methods for wireless data transmission between a base station and a transponder are described in which data packets to be transmitted comprise a header section, a data section with useful data, and a trailer section. By the appropriate insertion of a reference marker in the header section of a data packet transmitted from the base station to the transponder, the time delay can be adapted to the prevailing transmission conditions, and dynamically specified. This improves the flexibility and thus the applicability of a system based on a method of this nature.

In addition, the symbols can be coded using NRZ or NRZI coding. Such coding methods permit reliable coding of symbols to be transmitted.

The synchronization markers can be generated with double sideband modulation having a suppressed carrier. This reduces the spectrum required for generating the synchronization markers, improves transmission reliability, and expands the transmission range, while rendering unnecessary the resource-intensive envelope curve monitoring of the modulator being used.

The modulation control device can also have a timing pulse generator for providing a specifiable delay time and a timing controller that is connected to the timing pulse generator, and that can be supplied with a synchronization marker signal and a level to be transmitted, and is designed to drive a modulator. Such a design of a modulation control unit is simple to implement with regard to circuit design and permits simple expansion of a conventional transmitting or receiving section of a transponder, since it can be integrated into an existing circuit structure in a simple modular fashion without the need to significantly change the remaining circuit components or their interfaces.

In a further embodiment, the timing pulse generator can include a monostable multivibrator or an RC network followed respectively by a Schmitt trigger or an oscillator. Timing elements for producing the time delay are easy to implement in this manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
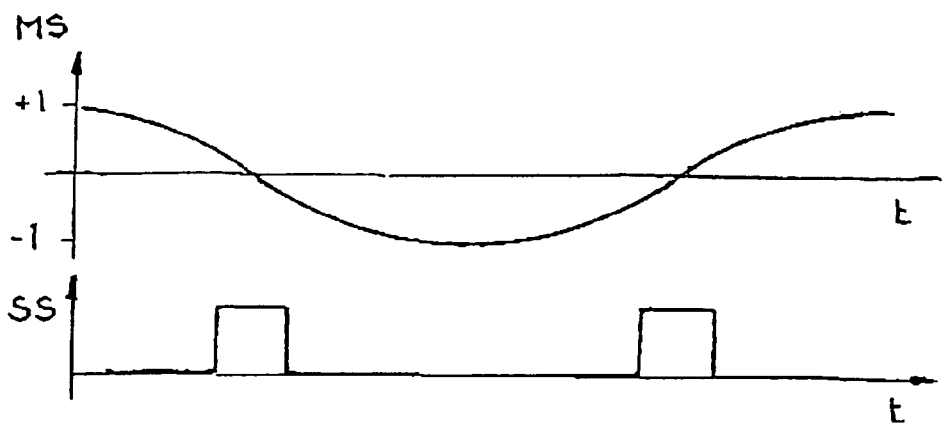
FIG. 1 is a diagram of a modulation signal of a base station for double sideband modulation with a suppressed carrier, and a resultant synchronization marker signal generated in an RSSI circuit, according to an embodiment of the present invention.
Figure 4:
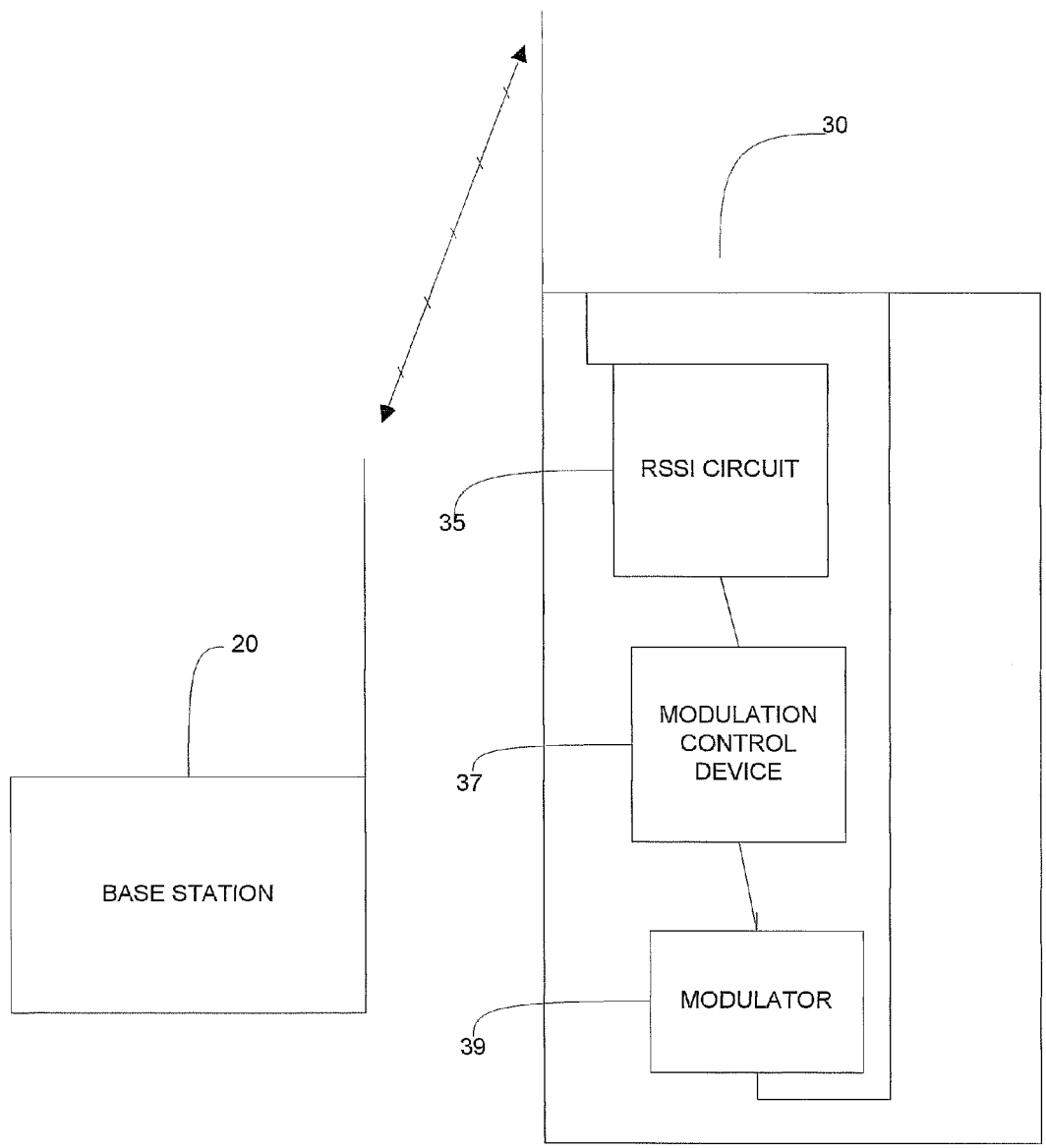
FIG. 4 is a block diagram showing the base station communicating with the transponder via the signals of FIGS. 1 and 2

FIG. 1 shows a diagram of a modulation signal MS of a base station 20 SHOWN IN FIG. 4 for double sideband modulation with a suppressed carrier. The modulation signal MS is used to modulate a carrier signal (not shown) that is emitted by the base station. FIG. 1 also shows a resulting synchronization marker signal SS generated in an RSSI (Received Signal Strength Indicator) circuit 35 of a passive transponder 30 as shown in FIG. 4. The cosine-shaped modulation signal MS shown in the upper part of FIG. 1 changes the phase position of the carrier signal by 180° upon a transition from +1 to −1 or from −1 to +1.

The lower part of FIG. 1 shows the resulting synchronization marker signal SS in a transponder 30 on reception of the carrier signal modulated with the modulation signal MS shown above. In the region of the phase transition, the power of the carrier signal drops or briefly goes to zero, which is detected by the RSSI circuit 35 of the transponder 30. The result is a rectangular shape for the synchronization marker signal SS in the region of the phase transitions of the carrier signal. A change of a modulation state of a signal backscattered by the transponder occurs synchronously, with a specifiable time delay relative to a synchronization marker or relative to a rising edge of the synchronization marker signal SS.

Figure 2:
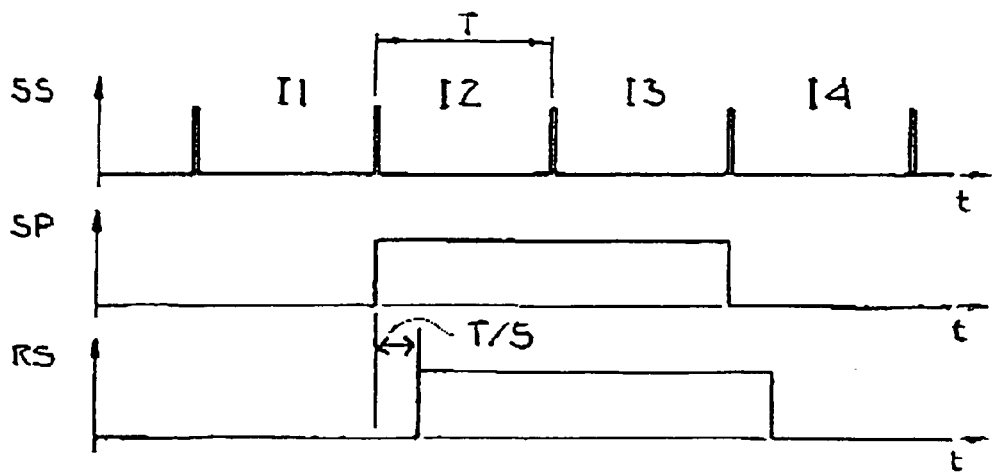
FIG. 2 is a timing diagram of a synchronization marker signal, a signal backscattered by a transponder, and an associated level to be transmitted.

The upper part of FIG. 2 shows the curve of the synchronization marker signal SS when successive synchronization markers generated by the base station are detected in the transponder as described above. Since the synchronization markers are short in comparison to the duration of the other signals, they are represented merely as short lines.

The center part of FIG. 2 shows the level SP to be transmitted by the transponder 30, which depends among other things on the coding method chosen and the value of a symbol or bit to be transmitted. The example embodiment shown is based on an NRZI coding. The level is "0" in a first interval I1, is "1" in a second and third interval I2 and I3, and is "0" in a fourth interval I4. A change in the level SP to be transmitted takes place simultaneously with a synchronization marker.

A signal RS backscattered by the transponder 30 is shown in the lower part of FIG. 2. A change in the modulation state of the backscattered signal RS takes place with a time delay relative to a synchronization marker. The time delay is one fifth of an interval duration T, which is defined by two successive synchronization markers. The backscattered signal RS results from a phase shift or time delay of T/5 in the level SP to be transmitted.

The time delay is specified by insertion of a reference marker in a header section of a data packet (not shown) that is transmitted from the base station 20 to the transponder.

As a result of the time delay between the synchronization markers generated by the base station 20 and a change in the modulation state of the backscattered signal RS, misreading of the signal backscattered from the transponder, which could otherwise result from the generation of the synchronization markers, is largely avoided.

Figure 3:
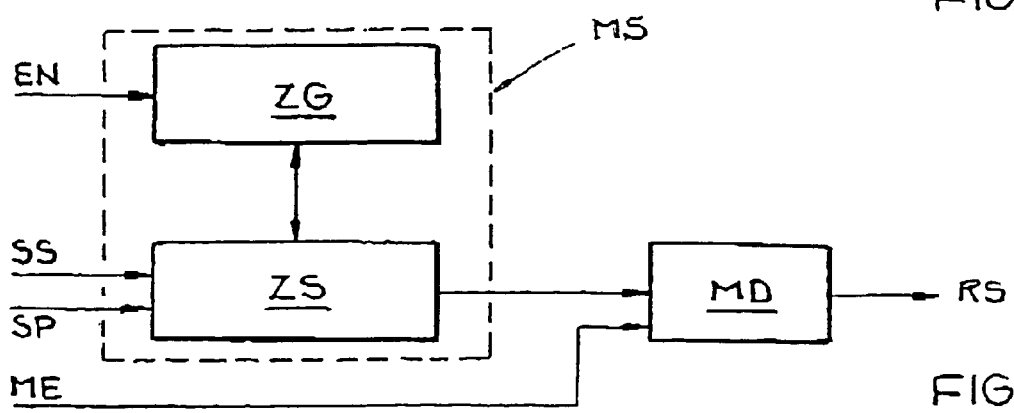
FIG. 3 is a block diagram of a modulation control device that can be integrated in a transponder according to an embodiment of the present invention.

FIG. 3 shows a block diagram of a modulation control device MS (37 in FIG. 4) for implementing the above-described method integrated in a transponder. The modulation control device MS includes a timing pulse generator ZG and a timing controller ZS.

The timing controller ZS is used to drive a modulator MD (39 of FIG. 4) and is supplied with the synchronization marker signal SS shown in FIGS. 1 and 2 and the level SP to be transmitted shown in FIG. 2. The synchronization marker signal SS and the level SP to be transmitted are produced by circuit components of the transponder that are not shown. The timing controller ZS is coupled to the timing pulse generator ZG. The timing pulse generator ZG is supplied with an enable signal EN, which activates or deactivates the timing pulse generator ZG as a function of its state. The enable signal EN is produced by a circuit component of the transponder that is not shown. In this way the power consumption is reduced in the deactivated state, for example when no communication takes place between the base station and the transponder. The timing pulse generator ZG can contain, for example, a monostable multivibrator or an RC network followed respectively by a Schmitt trigger or an oscillator.

The timing controller ZS is triggered by pulses of the synchronization marker signal SS. After receiving a pulse, i.e. a synchronization marker, the timing pulse generator ZG is started by the timing controller ZS. If the timing pulse generator ZG is implemented as an oscillator, this can be accomplished, for example, by resetting a counter whose count state is changed at the rate of the oscillator. The timing pulse generator ZG signals the expiration of a specifiable delay time to the timing controller ZS, which then applies to the modulator MD the level SP to be transmitted. The state of the level SP to be transmitted is held by the timing controller ZS until a level change in the level SP to be transmitted takes place at its input, a synchronization marker is received, and the delay time within the timing pulse generator ZG has elapsed.

The modulator MD produces the backscattered signal RS from the signal received from the timing controller ZS. The modulator MD is additionally supplied with a modulator enable signal ME, which can switch the modulator into an energy saving mode if no communication is necessary at the time. The modulator enable signal ME is generated by a circuit component of the transponder that is not shown.

The example embodiments shown permit reliable evaluation of the signals backscattered by a transponder without complicated monitoring of the modulated carrier signal emitted by the base station, since misreading of the signal backscattered from the transponder resulting from the generation of the synchronization markers is largely avoided.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

Figure 5:
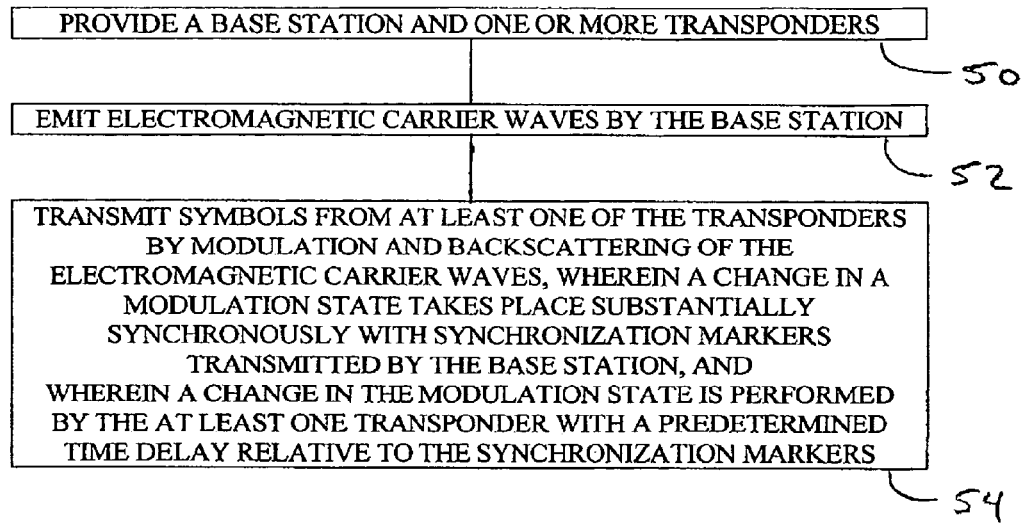
FIG. 5 is a flow chart illustrating a method according to an embodiment of the present invention.

FIG. 5 illustrates a method according to an embodiment of the present invention that includes a step 50 of providing a base station and one or more transponders, a step 52 of emitting electromagnetic carrier waves by the base station, and a step 54 of transmitting symbols from at least one of the transponders by modulation and backscattering of the electromagnetic carrier waves, wherein a change in a modulation state takes place substantially synchronously with synchronization markers transmitted by the base station, and wherein a change in the modulation state is performed by the at least one transponder with a predetermined time delay relative to the synchronization markers.

Figure 6:
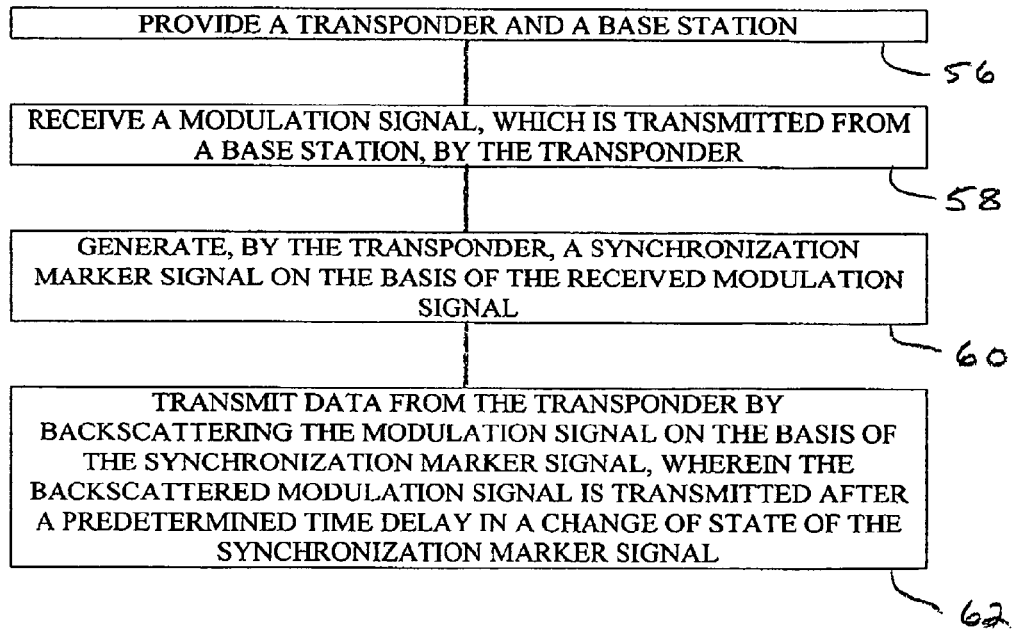
FIG. 6 is a flow chart illustrating a method according to an embodiment of the present invention.

FIG. 6 illustrates a method according to an embodiment of the present invention that includes a step 56 of providing a transponder and a base station, a step 58 of receiving a modulation signal, which is transmitted from a base station, by the transponder, a step 60 of generating, by the transponder, a synchronization marker signal on the basis of the received modulation signal, and a step 62 of transmitting data from the transponder by backscattering the modulation signal on the basis of the synchronization marker signal, wherein the backscattered modulation signal is transmitted after a predetermined time delay in a change of state of the synchronization marker signal.

What is claimed is:

1. A method for wireless data transmission between a base station and one or more transponders, the method comprising the steps of:
    emitting electromagnetic carrier waves by the base station; and
    transmitting symbols from at least one of the transponders by modulation and backscattering of the electromagnetic carrier waves,
    wherein a change in a modulation state takes place substantially synchronously with synchronization markers transmitted by the base station, and
    wherein a change in the modulation state is performed by the at least one transponder with a predetermined time delay relative to the synchronization markers.

2. The method according to claim 1, wherein the time delay is specified such that it lies in a range from one eighth to one quarter of a duration within which a symbol is coded.

3. The method according to claim 1, wherein the time delay is specified by the base station in that it transmits a reference marker in a header section of a data packet.

4. The method according to claim 2, wherein the symbols are coded using NRZ (non return to zero) or NRZI (non return to zero inverted) coding, 5. The method according to claim 1, wherein the synchronization markers are generated by double sideband modulation having a suppressed carrier, 6. The method according to claim 1, wherein the transponders are passive transponders.

7. The method according to claim 1, wherein the symbols that are transmitted from at least one of the transponders are transmitted to the base station, a different base station, or a different transponder.

8. A method of transmitting data from a transponder to a base station, the method comprising:

receiving a modulation signal, which is transmitted from a base station, by the transponder;

generating, by the transponder, a synchronization marker signal on the basis of the received modulation signal;

transmitting data from the transponder by backscattering the modulation signal on the basis of the synchronization marker signal, wherein the backscattered modulation signal is transmitted after a predetermined time delay in a change of state of the synchronization marker signal.

9. The method according to claim 8, wherein the data is transmitted from the transponder to the base station that transmitted the modulation signal, to a different base station, or to a different transponder.

* * * * *